United States Patent
Nozawa

(10) Patent No.: US 12,405,025 B2
(45) Date of Patent: Sep. 2, 2025

(54) AIR-CONDITIONING OUTLET DEVICE

(71) Applicant: MORIROKU TECHNOLOGY COMPANY, LTD., Tokyo (JP)

(72) Inventor: Hiroaki Nozawa, Tokyo (JP)

(73) Assignee: MORIROKU CO., LTD., Tokyo (JP)

( * ) Notice: Subject to any disclaimer, the term of this patent is extended or adjusted under 35 U.S.C. 154(b) by 392 days.

(21) Appl. No.: 18/312,130

(22) Filed: May 4, 2023

(65) Prior Publication Data
US 2023/0400218 A1 Dec. 14, 2023

(30) Foreign Application Priority Data
Jun. 14, 2022 (JP) .................... 2022-095604

(51) Int. Cl.
*F24F 13/06* (2006.01)
*F24F 13/20* (2006.01)

(52) U.S. Cl.
CPC .............. *F24F 13/06* (2013.01); *F24F 13/20* (2013.01)

(58) Field of Classification Search
CPC ........ F24F 13/06; F24F 13/20; F24F 13/1413; F24F 13/142; F24F 13/14; F24F 13/1486; F24F 2203/1004
USPC .......................... 454/325, 326, 327, 335, 336
See application file for complete search history.

(56) References Cited

U.S. PATENT DOCUMENTS

| | | | |
|---|---|---|---|
| 4,345,510 A * | 8/1982 | Sterett ................ | B60H 1/3428 454/155 |
| 6,685,555 B1 * | 2/2004 | Davis, Jr. ............ | B60H 1/3421 454/319 |
| 2014/0120826 A1 * | 5/2014 | Takai ................... | B60H 1/3421 454/325 |
| 2016/0116184 A1 * | 4/2016 | Chappell ............. | F24F 13/1406 454/335 |
| 2019/0047377 A1 * | 2/2019 | Tanaka ................ | F24F 13/15 |
| 2021/0094242 A1 * | 4/2021 | Egashira ............. | B29C 45/0025 |
| 2021/0107333 A1 * | 4/2021 | Egashira ............. | B60H 1/3421 |

FOREIGN PATENT DOCUMENTS

| | | |
|---|---|---|
| CN | 207808989 U | 9/2018 |
| JP | S55-153531 U | 11/1980 |
| JP | H5-42953 U | 6/1993 |
| JP | 2015-152202 A | 8/2015 |

* cited by examiner

*Primary Examiner* — Avinash A Savani
*Assistant Examiner* — Ryan L Faulkner
(74) *Attorney, Agent, or Firm* — Rankin, Hill & Clark LLP

(57) ABSTRACT

The air-conditioning outlet device includes the housing having a frame shape and having a flow path through which air flows. The housing has an overlapping surface that a fin is overlappable in a state where the flow path is closed, and a clearance recess recessed from the overlapping surface so as not to come into contact with the fin when the fin rotates from the state where the flow path is closed. The clearance recess of the housing and the fin define a blow-in space into which the air is blown from a gap between the housing and the fin. One of the fin and the housing includes a barrier wall that interferes with the air flowing through the blow-in space.

5 Claims, 11 Drawing Sheets

AIR-CONDITIONING OUTLET DEVICE

FIELD OF THE INVENTION

The present invention relates to an air-conditioning outlet device in which air blown out from an outlet can be shut off by a rotating fin.

BACKGROUND

A vehicle such as a passenger car is provided with an air-conditioning outlet device that is an outlet capable of blowing air out toward a vehicle cabin. A technique relating to the air-conditioning outlet device in the related art has been disclosed.

An air-conditioning outlet device disclosed in Japanese Unexamined Patent Publication No. 2015-152202 includes a housing having a frame shape and having a flow path through air flows; a fin which is disposed in the flow path and by which the flow path is openable and closable; and an operation knob with which the fin can be operated from the outside. The fin includes a plurality of plate-shaped portions and shaft portions that protrude from the respective plate-shaped portions in opposite directions and that are supported by the housing.

When an occupant operates the operation knob from the outside, the fin can rotate (turn) around the shaft portions supported by the housing, to open and close the flow path. When the flow path is closed, the blowing of the air from an outlet to the vehicle cabin can be shut off.

The fin is rotatably set inside the housing. Further, the fin is attached by fitting the shaft portions of the fin to the housing having a frame shape. For this reason, a slight gap is generated around the shaft portions of the fin. Even in the state where the flow path is closed, the air that has leaked from the gap is blown into the vehicle cabin.

Particularly, when the housing has a frame shape, namely, when support portions that support the respective shaft portions of the fin are not separated but integrated, in order to allow the fin to be fitted to the housing, the gap around the shaft portions of the fin inevitably becomes large.

An object of the invention is to provide a technique of being able to suppress the leakage of air from a gap around a shaft portion of a fin in an air-conditioning outlet device including a housing having a frame shape.

SUMMARY

According to a first aspect, there is provided an air-conditioning outlet device including: a housing having a frame shape and having a flow path through which air flows; and a fin which is disposed in the flow path and by which the flow path is openable and closable. The fin includes a plate-shaped portion and a pair of shaft portions protruding from the plate-shaped portion in opposite directions. The housing includes a pair of support portions that support the respective shaft portions and that are integrated with each other. Each of the support portions includes a base portion having a support hole that rotatably supports the shaft portion, with respect to the base portion, a stepped portion stepped in a direction toward a center of the housing with an axis direction of the shaft portion as a reference, and a connecting portion that connects the base portion and the stepped portion. The connecting portion has an overlapping surface that the plate-shaped portion of the fin is overlappable in a state where the flow path is closed, and a clearance recess recessed from the overlapping surface so as not to come into contact with the fin when the fin rotates from the state where the flow path is closed. In the state where the flow path is closed, the clearance recess of the connecting portion and the plate-shaped portion define a blow-in space into which the air is blown from a gap between the plate-shaped portion and the base portion. One of the fin and the housing includes a barrier wall that interferes with the air flowing through the blow-in space.

According to a second aspect, in the air-conditioning outlet device according to the first aspect, it is preferable that the shaft portion includes a large-diameter portion having an annular end surface that is contactable with an edge of the support hole, that the barrier wall is formed of a bulging portion that bulges from the fin and the large-diameter portion toward a wall surface of the clearance recess, and that the bulging portion has a facing surface facing the wall surface of the clearance recess.

According to a third aspect, in the air-conditioning outlet device according to the second aspect, it is preferable that a lightening recess is formed on an opposite side of the fin from the bulging portion.

According to a fourth aspect, in the air-conditioning outlet device according to the first aspect, it is preferable that the barrier wall is formed of a fin-side lid portion provided on the plate-shaped portion so as to close the blow-in space.

According to a fifth aspect, in the air-conditioning outlet device according to the first aspect, it is preferable that the barrier wall is formed of a housing-side lid portion provided on the housing so as to close the blow-in space.

The air-conditioning outlet device includes the housing having a frame shape and having the flow path through which the air flows. The housing includes the pair of support portions that support the respective shaft portions and that are integrated with each other. Each of the support portions includes the base portion having the support hole that rotatably supports the shaft portion, the stepped portion stepped with respect to the base portion, and the connecting portion that connects the base portion and the stepped portion.

The connecting portion has the overlapping surface that the plate-shaped portion of the fin is overlappable in the state where the flow path is closed, and the clearance recess recessed from the overlapping surface so as not to come into contact with the fin when the fin rotates from the state where the flow path is closed.

In the state where the flow path is closed, the clearance recess of the connecting portion and the plate-shaped portion define the blow-in space into which the air is blown from the gap between the plate-shaped portion and the base portion. One of the fin and the housing includes the barrier wall that interferes with the air flowing through the blow-in space.

With the above configuration, the flow of the air that has flowed from a gap between the fin and the housing into the blow-in space is interfered with by the barrier wall. The leakage of the air around the shaft portion can be suppressed.

DETAILED DESCRIPTION OF THE PREFERRED EMBODIMENTS

Figure 1:
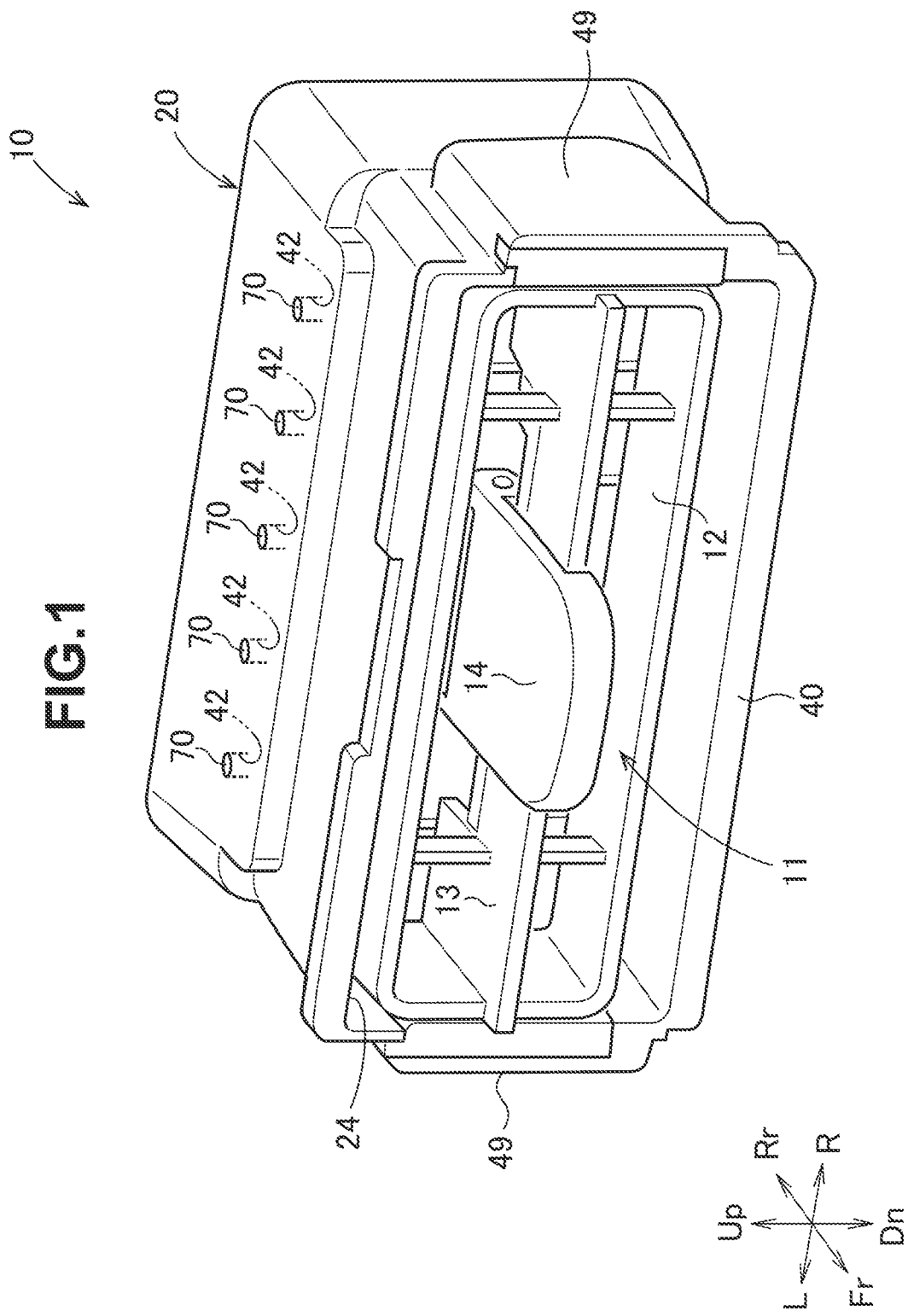
FIG. 1 is a perspective view of an air-conditioning outlet device according to a first embodiment.

Embodiments of the invention will be described with reference to the accompanying drawings. Incidentally, in the drawings, Fr represents the front, Rr represents the rear, L represents the left, R represents the right, Up represents the top or up, and Dn represents the bottom or down. Further, with the flow direction of air inside a housing as a reference, an upstream side is referred to as the rear and a downstream side is referred to as the front.

First Embodiment

FIG. 1 illustrates an air-conditioning outlet device 10 disposed in front of an occupant in a passenger car. The air-conditioning outlet device 10 is a resin-molded product, and can shut off air blown out from an outlet to a vehicle cabin, when an operation knob 14 to be described later is slid leftward and rightward.

Figure 2:
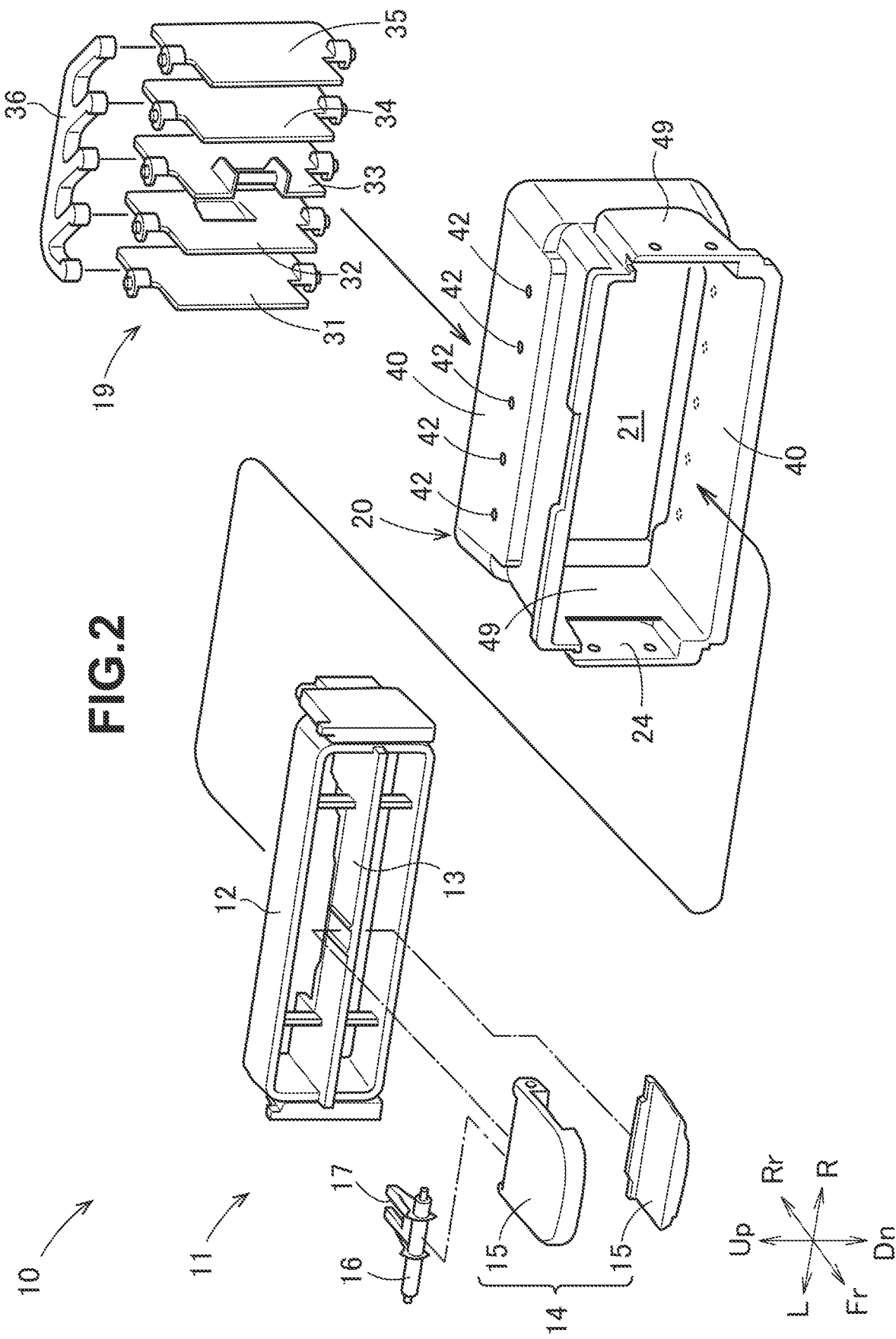
FIG. 2 is an exploded perspective view of the air-conditioning outlet device illustrated in FIG. 1.

Referring to FIG. 2, the air-conditioning outlet device 10 includes a housing 20 having a frame shape and having a flow path 21 through which air flows; a fin unit 19 which is disposed in the flow path 21 and by which the flow path 21 is openable and closable; an outlet-side member 11 that can be attached to an outlet 24 of the housing 20; and the operation knob 14 which can be attached to the outlet-side member 11 and with which the occupant can operate the fin unit 19 from the outside.

The outlet-side member 11 includes a body portion 12 having a frame shape, and an elongated portion 13 having a plate shape and provided to partition the inside of the body portion 12 in a longitudinal direction.

The operation knob 14 includes a pair of knob halves 15 and 15 that sandwich the elongated portion 13 therebetween, and a connector 16 that is supported by the pair of knob halves 15 and 15 and that connects the operation knob 14 and the fin unit 19.

The fin unit 19 includes a first fin 31 to a fifth fin 35 each having a plate shape, and a link 36 that connects the first fin 31 to the fifth fin 35 to each other to synchronize the directions of each of the fins. Incidentally, the number of the fins can be changed as appropriate.

Figure 3:
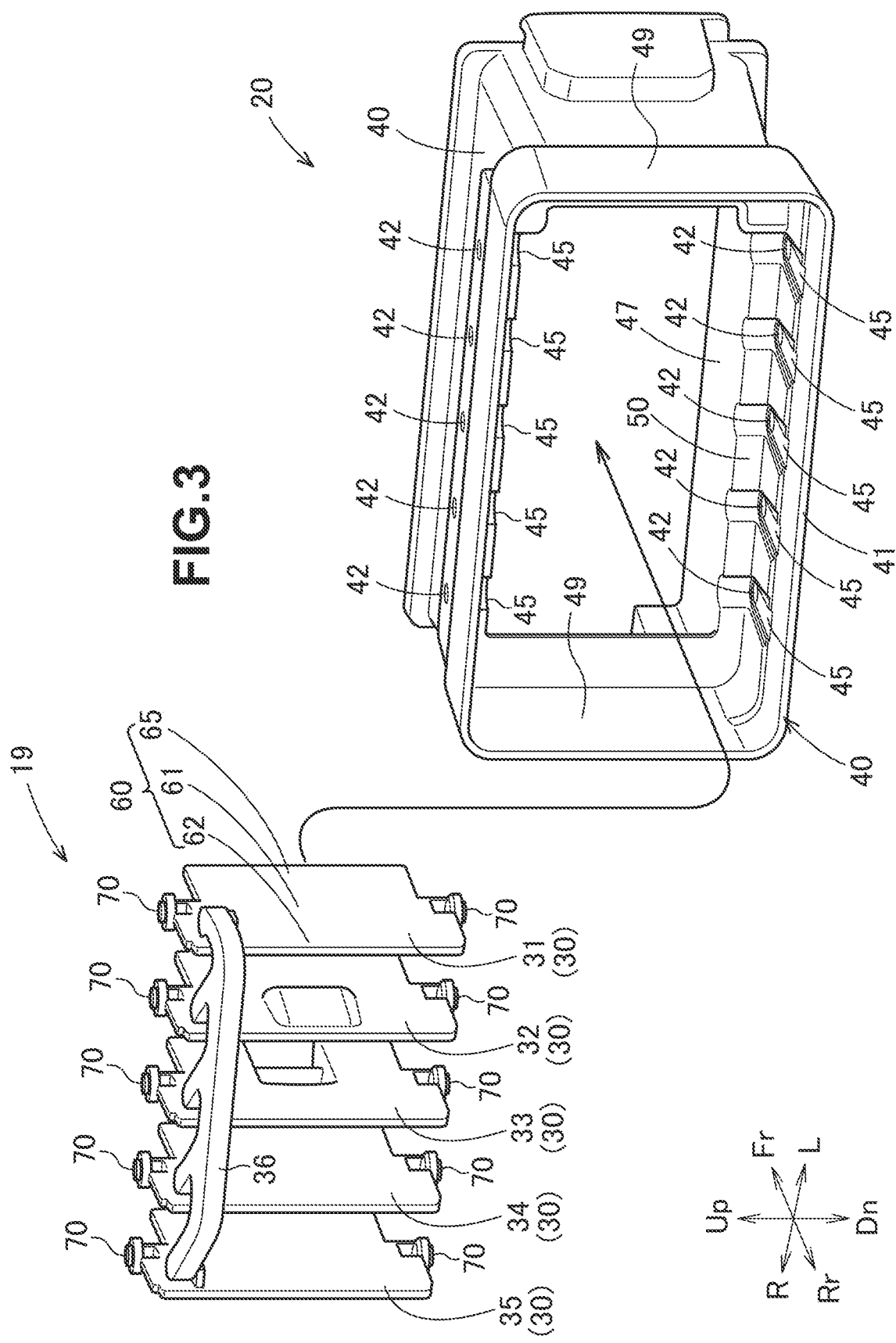
FIG. 3 is a view of a housing and fins as viewed from an upstream side.

Referring to FIG. 3, the first fin 31 to the fifth fin 35 have the same basic configuration. Hereinafter, the first fin 31 to the fifth fin 35 will be described as a "fin 30". The fin 30 is configured such that a plate-shaped portion 60 and a pair of shaft portions 70 and 70 protruding from the plate-shaped portion 60 in opposite directions are integrated.

The housing 20 is configured such that a pair of support portions 40 and 40 which extend parallel to each other and which can support the respective fins 30 and side walls 49 and 49 which extend orthogonal to the support portions 40 and 40 and which connect both ends of the support portions 40 and 40 are integrated.

Figure 4:
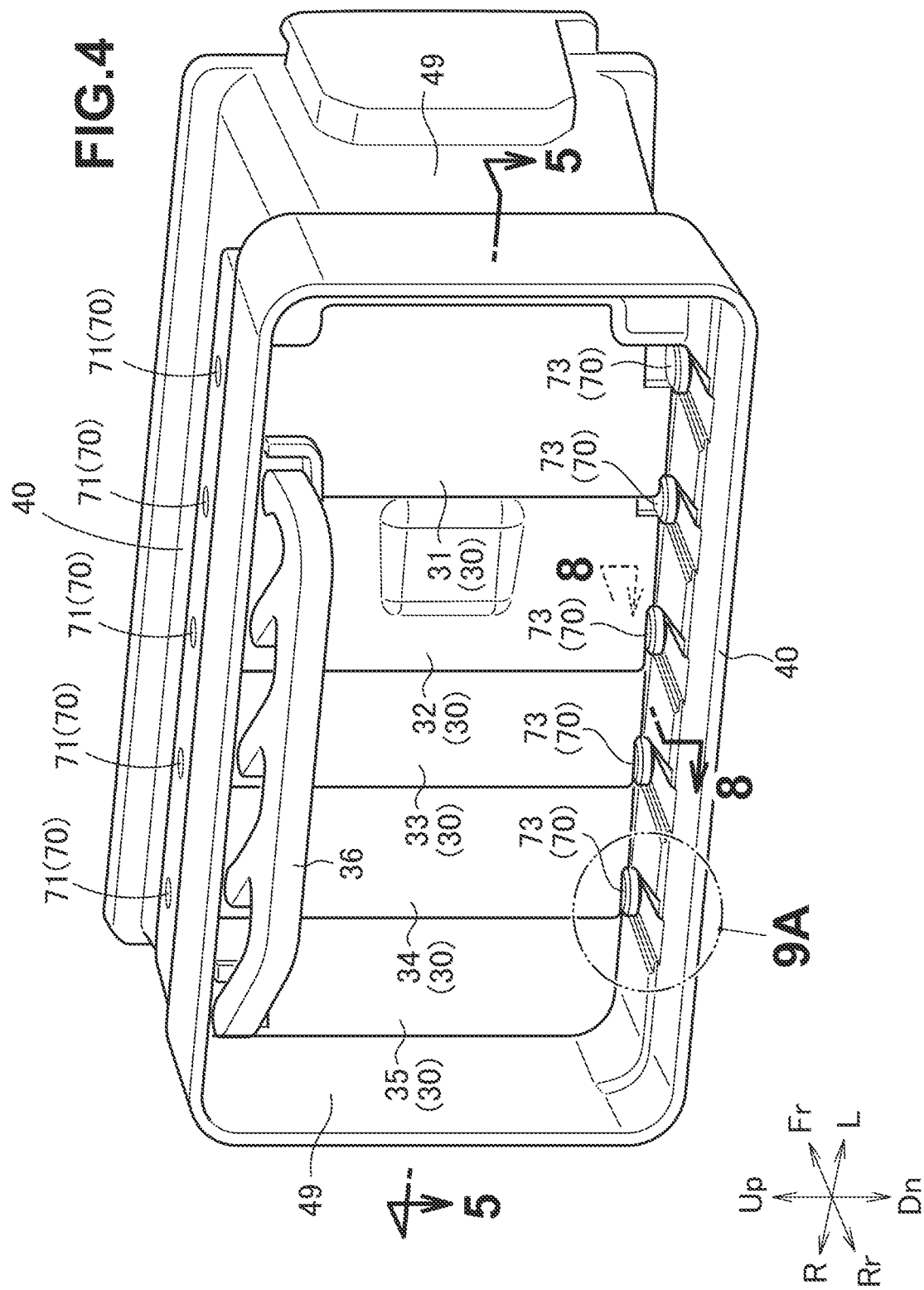
FIG. 4 is a view of the housing to which the fins are attached, as viewed from the upstream side.
Figure 5:
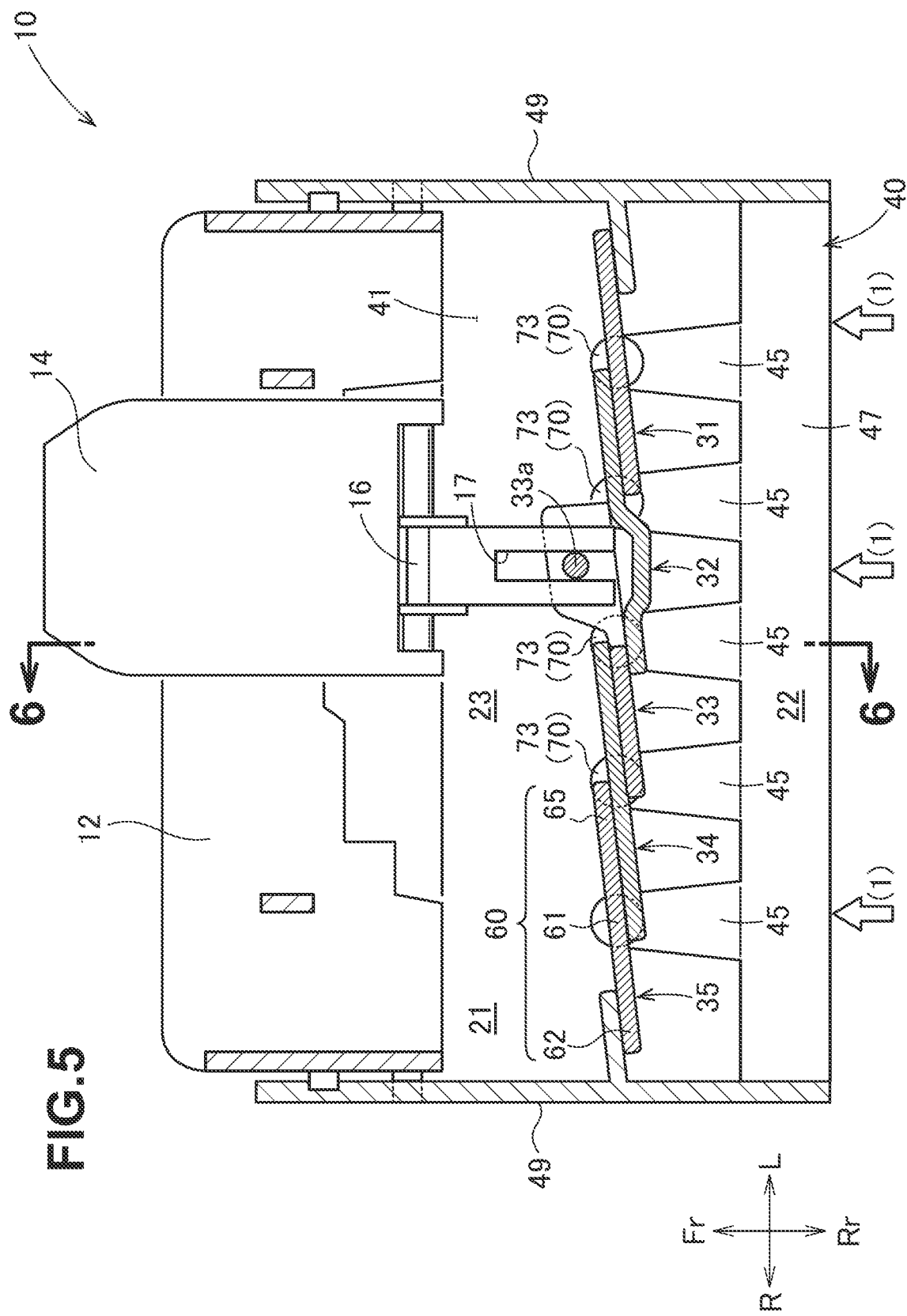
FIG. 5 is a cross-sectional view taken along line 5-5 in FIG. 4.

Referring to FIG. 4 and FIG. 5, when the operation knob 14 is moved leftward and rightward, the connector 16 fixed to the operation knob 14 also moves leftward and rightward. A groove 17 of the connector 16 sandwiches a round rod-shaped portion 33a of a third fin 33. When the round rod-shaped portion 33a moves along the groove 17, the third fin 33 rotates around the shaft portions 70 as the center. The first fin 31, the second fin 32, the fourth fin 34, and the fifth fin 35 connected to the third fin 33 via the link 36 swing around the respective shaft portions 70 as the centers.

Referring to FIG. 5, with the flow direction of air as a reference (refer to arrow (1) in FIG. 5), in a state where the flow path 21 is closed, an upstream side of the shaft portions 70 of the respective fins 30 (31 to 35) is referred to as an upstream flow path 22, and a downstream side of the shaft portions 70 of the respective fins 30 (31 to 35) is referred to as a downstream flow path 23.

Referring to FIG. 3 and FIG. 5, the plate-shaped portion 60 is configured such that a center portion 61 between the shaft portions 70 and 70, an upstream fin 62 located outside the center portion 61 in a radial direction of the shaft portions 70 to swing in the upstream flow path 22, and a downstream fin 65 located outside the center portion 61 in the radial direction of the shaft portions 70 to swing in the downstream flow path 23 are integrated.

Figure 6:
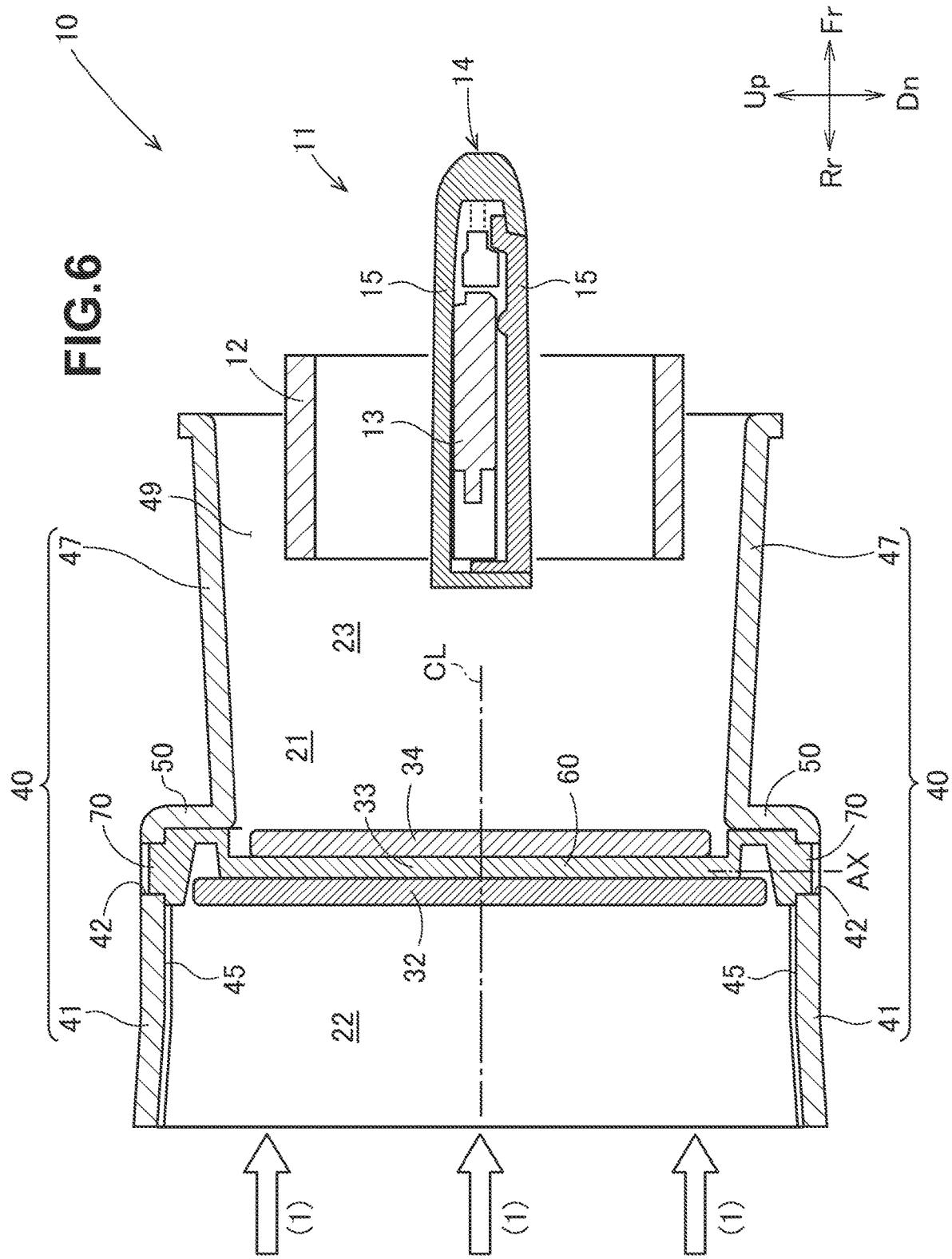
FIG. 6 is a cross-sectional view taken along line 6-6 in FIG. 5.

Referring to FIG. 3 and FIG. 6, each of the support portions 40 is configured such that a base portion 41 having support holes 42 capable of supporting the shaft portion 70, a stepped portion 47 stepped with respect to the base portion 41, and a connecting portion 50 which connects the base portion 41 and the stepped portion 47 are integrated. With a direction in which an axis AX of the shaft portions 70 extends (up-down direction) as a reference, the stepped portion 47 is closer to a center CL of the housing 20 than the base portion 41. The base portion 41 has guide grooves 45 that guide the shaft portions 70 to the support holes 42 when the fin unit 19 is fitted and attached to the housing 20.

Figure 7:
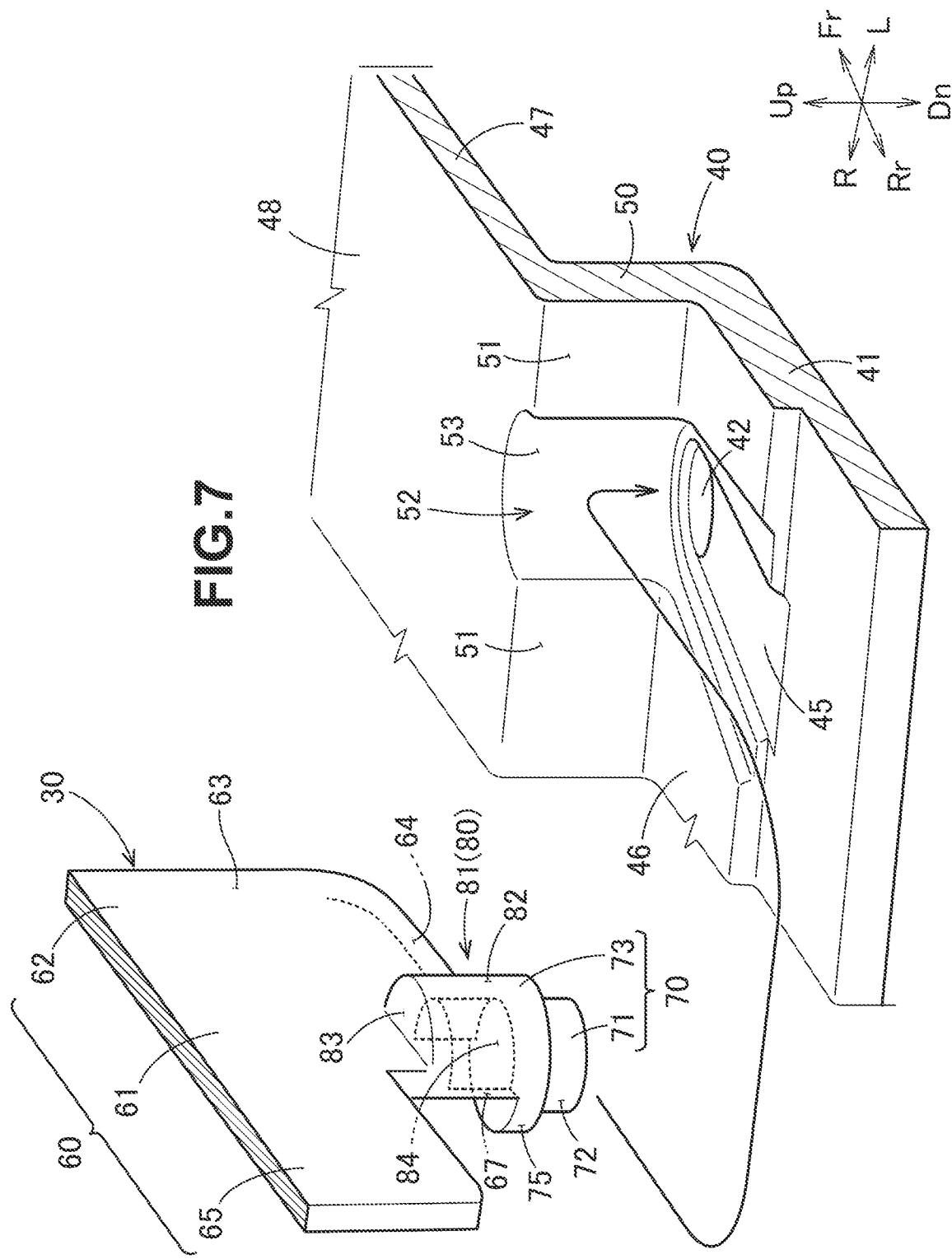
FIG. 7 is a view for describing a configuration of a shaft portion of the fin and of the periphery of a support hole of a base portion of the housing.

Referring to FIG. 7, the connecting portion 50 of the support portion 40 has an overlapping surface 51 that overlaps a front surface 63 of the upstream fin 62 in a state where the flow path 21 is closed (refer to FIG. 5), and a clearance recess 52 recessed from the overlapping surface 51.

The clearance recess 52 is open toward the upstream side (the rear), and is set such that the support portion 40 does not come into contact with the center portion 61 or the shaft portions 70 of the fin 30 when the fin 30 rotates. A wall surface 53 of the clearance recess 52 is an arc-shaped surface centered on the axis AX.

Figure 8:
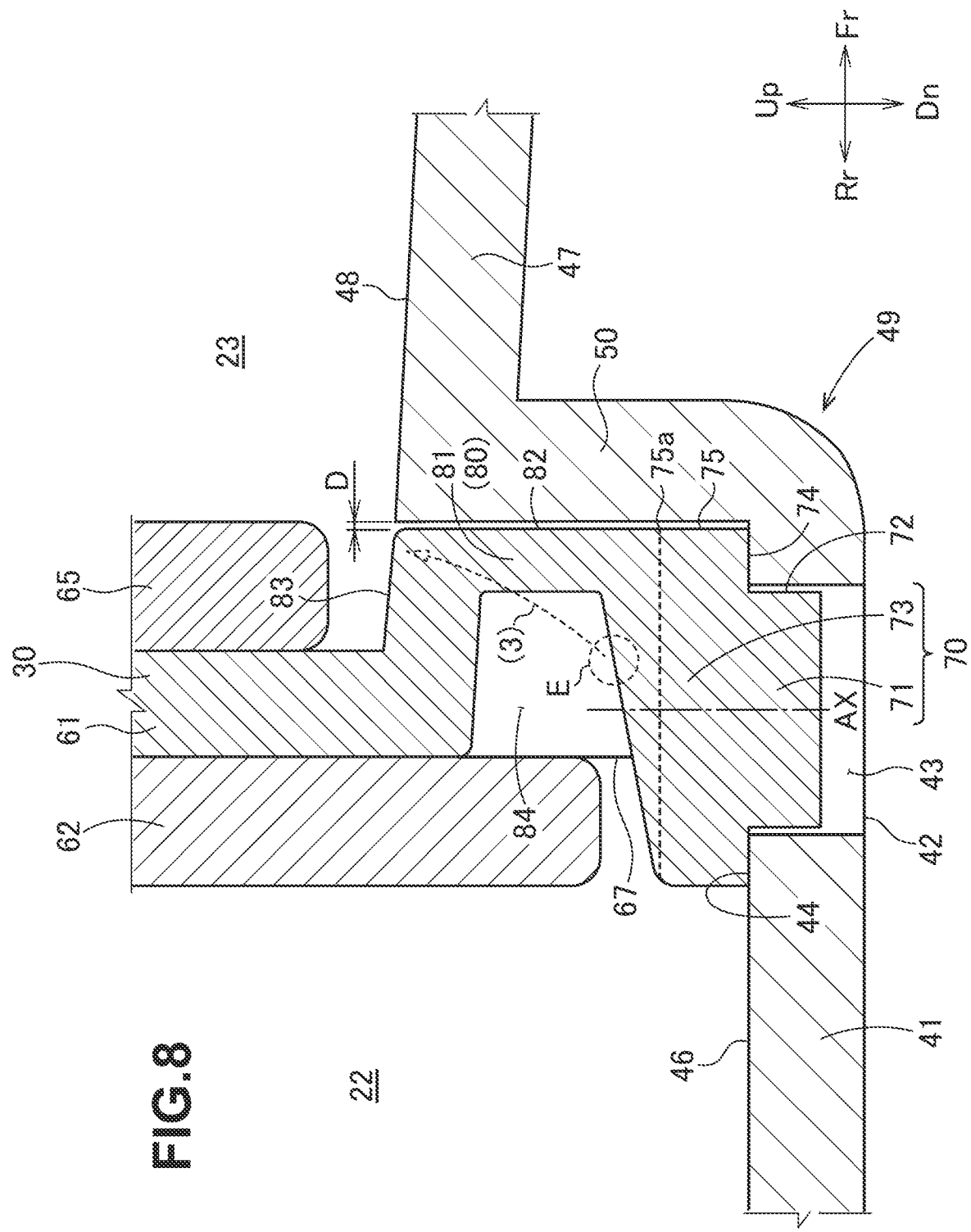
FIG. 8 is a cross-sectional view taken along line 8-8 in FIG. 4.

Referring to FIG. 7 and FIG. 8, the shaft portion 70 is configured such that a small-diameter portion 71 of which an outer peripheral surface 72 is rotatably supported on an inner peripheral surface 43 of the support hole 42 and a large-diameter portion 73 which has a larger diameter than that of the small-diameter portion 71 and which is located closer to a center CL side of the housing 20 than the small-diameter portion 71 are integrated. An annular outer end surface 74 of the large-diameter portion 73 can come into contact with an edge 44 of the support hole 42. The large-diameter portion 73 regulates the position (axis AX direction) of the fin 30.

Figure 9C:
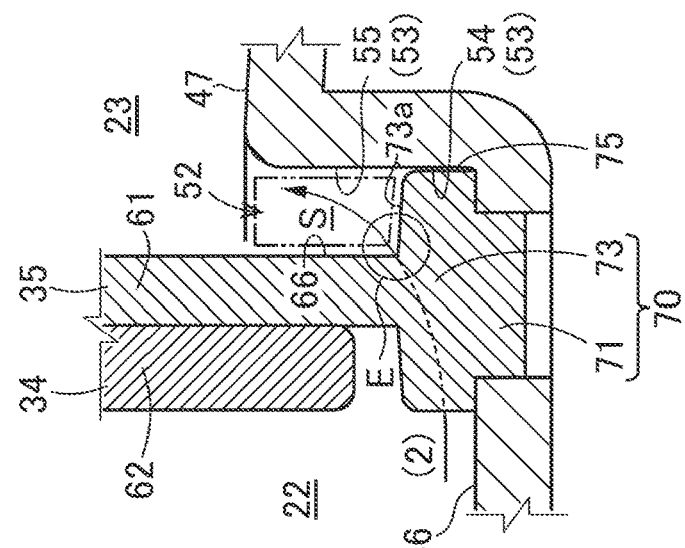
FIG. 9C is a cross-sectional view taken along line 9C-9C in FIG. 9B.
Figure 9B:
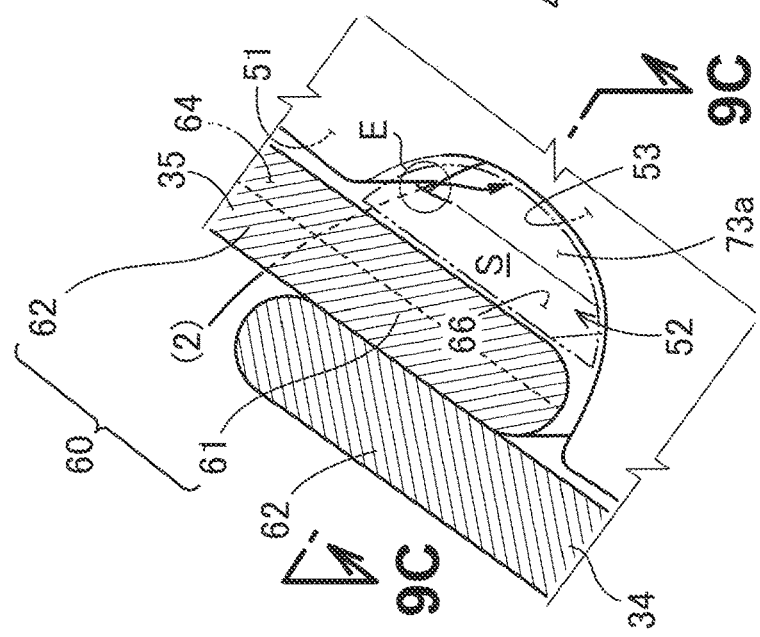
FIG. 9B is a view for describing a blow-in space.

Referring to FIG. 9B and FIG. 9C, the wall surface 53 of the clearance recess 52 includes an outer peripheral portion 54 located on an outer peripheral side of an outer peripheral surface 75 of the large-diameter portion 73 of the fin 30, and a non-contact portion 55 that is located closer to the center CL side than the outer peripheral portion 54 and that does not come into contact with the outer peripheral surface 75 of the large-diameter portion 73. In a state where the flow path 21 is closed, a front surface 66 of a center portion 61 of the fin 30, the non-contact portion 55 of the clearance recess 52, and an inner end surface (surface facing the center CL) of the large-diameter portion 73 define a blow-in space S having a semicircular columnar shape. Incidentally, for convenience of description of the blow-in space S, a "barrier wall 80" to be described later is not drawn in FIG. 9B and FIG. 9C.

Figure 9A:
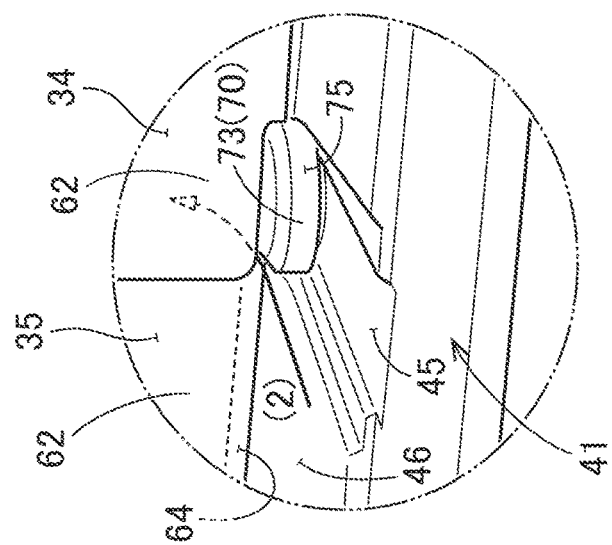
FIG. 9A is an enlarged view of a portion surrounded by line 9A in FIG. 4.

Referring to FIG. 9A, the fin 30 is rotatably provided inside the housing 20. For this reason, a slight gap is generated between an end surface 64 (refer to also FIG. 7) of the upstream fin 62 of the fifth fin 35 and an inner surface 46 (surface facing the center CL side) of the base portion 41. As indicated by arrow (2), air can enters the gap.

Referring to FIG. 9B and FIG. 9C, a gap is also generated at a location where the boundary between the large-diameter portion 73 and the end surface 64 of the upstream fin 62 and the boundary between the clearance recess 52 and the overlapping surface 51 overlap each other. The air that has flown between the end surface 64 and the inner surface 46 uses the gap as an inlet E, and the air is blown into the blow-in space S.

Referring to FIG. 7 and FIG. 8, the fin 30 includes the barrier wall 80 that interferes with the air flowing from the blow-in space S (refer to FIG. 9B) toward the downstream flow path 23. The barrier wall 80 is formed of a bulging portion 81 that bulges from the center portion 61 of the fin 30 and the large-diameter portion 73 toward the wall surface 53 of the clearance recess 52. In other words, the bulging portion 81 narrows an air flow path by filling the blow-in space S.

The bulging portion 81 has a facing surface 82 facing the wall surface 53 of the clearance recess 52. In other words, it can be said that the facing surface 82 of the bulging portion 81 is a surface extending from an edge 75a of the outer peripheral surface 75 of the large-diameter portion 73 to the center CL side of the housing 20. The facing surface 82 is an arc-shaped surface centered on the axis AX, and is a surface along the wall surface 53 of the clearance recess 52. It is preferable that a slight gap D which does not interfere with the rotation of the fin 30 is provided between the facing surface 82 of the bulging portion 81 and the wall surface 53 of the clearance recess 52. An upper surface 83 of the bulging portion 81 is located on substantially the same plane as an inner surface 48 (surface facing the center CL side) of the stepped portion 47.

As described above, the gap D is set between the facing surface 82 of the bulging portion 81 and the wall surface 53 of the clearance recess 52. Even when the air is blown into the blow-in space S (refer to FIG. 9B and FIG. 9C) from the inlet E, as indicated by arrow (3), the blown-in air flows through the gap D between the facing surface 82 of the bulging portion 81 and the wall surface 53 of the clearance recess 52. Compared to the case where the bulging portion 81 (barrier wall 80) is not provided, the flow speed of the air also becomes slower, and the leakage of the air around the shaft portions 70 can be suppressed.

Referring to FIG. 7 and FIG. 8, the center portion 61 of the fin 30 includes a lightening recess 84 recessed from a rear surface 67 of the center portion 61 of the fin 30 toward the bulging portion 81. Namely, the lightening recess 84 is formed on a side opposite the bulging portion 81. The bulging portion 81 has a box shape that is open toward the upstream flow path 22. The time of a step of forming the fin 30 (31 to 35) can be shortened and deformation can also be suppressed.

Second Embodiment

Figure 10A:
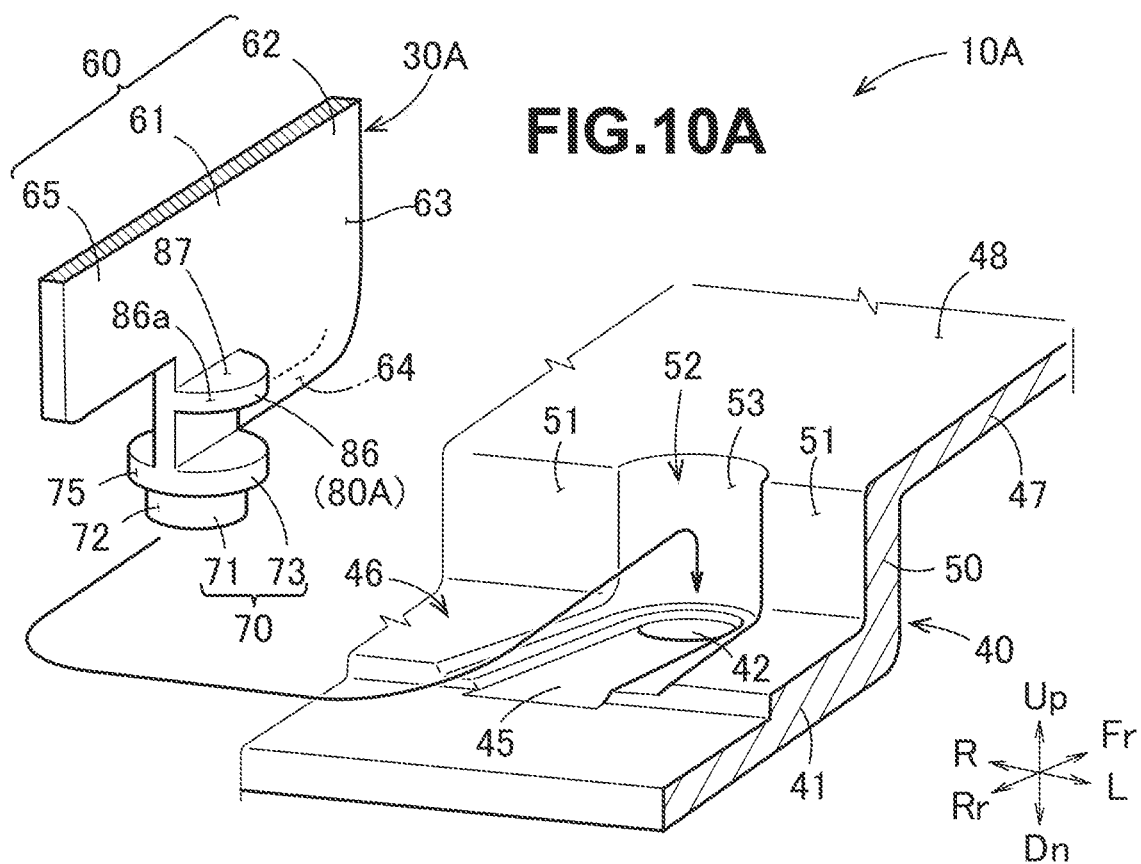
FIG. 10A is a view for describing an air-conditioning outlet device according to a second embodiment.

Referring to FIG. 10A, an air-conditioning outlet device 10A according to a second embodiment includes a fin 30A. Configurations that are common to the air-conditioning outlet device 10 of the first embodiment are denoted by the same reference signs as in the first embodiment, and descriptions thereof will not be repeated.

Figure 10B:
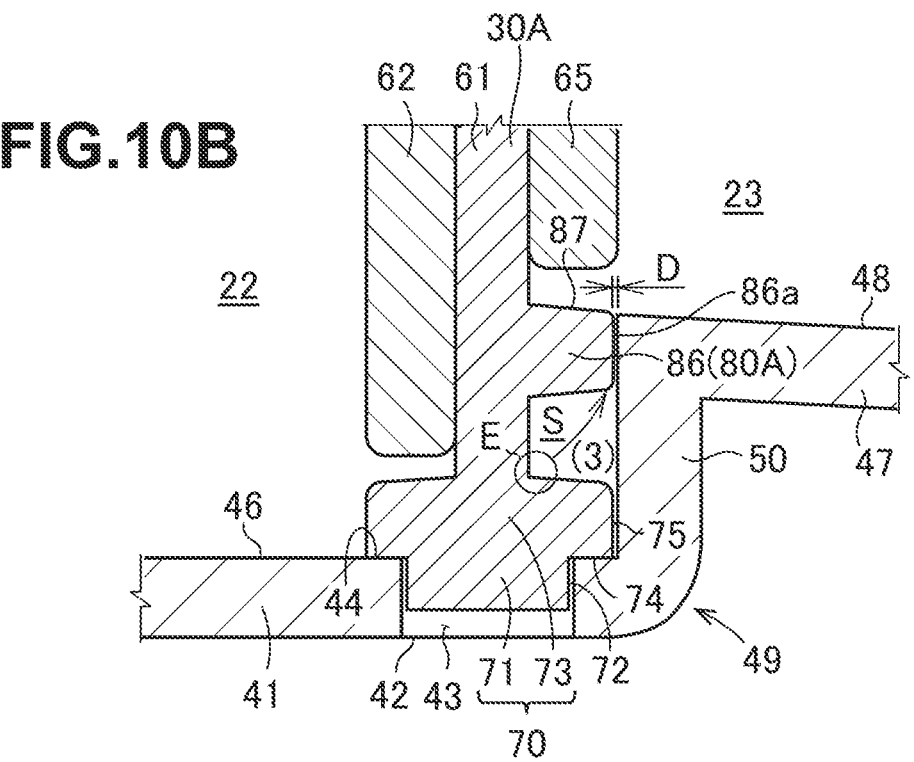
FIG. 10B is a view for describing an action of the air-conditioning outlet device according to the second embodiment.

Referring to FIG. 10A and FIG. 10B, a barrier wall 80A is formed of a fin-side lid portion 86 that is provided on the center portion 61 of the fin 30A to close the blow-in space S. The fin-side lid portion 86 has a semicircular plate shape, and the thickness and the diameter of the fin-side lid portion 86 are substantially the same as those of the large-diameter portion 73. An upper surface 87 (surface facing the center CL side) of the fin-side lid portion 86 is located on substantially the same plane as (namely, is flush with) the inner surface 48 of the stepped portion 47. It is preferable that the slight gap D which does not interfere with the rotation of the fin 30A is provided between an outer peripheral surface 86a of the fin-side lid portion 86 and the wall surface 53 of the clearance recess 52.

As indicated by arrow (3), the flow of the air that has flowed from the inlet E into the blow-in space S is shut off by the fin-side lid portion 86. The leakage of the air around the shaft portions 70 can be suppressed.

Third Embodiment

Figure 11A:
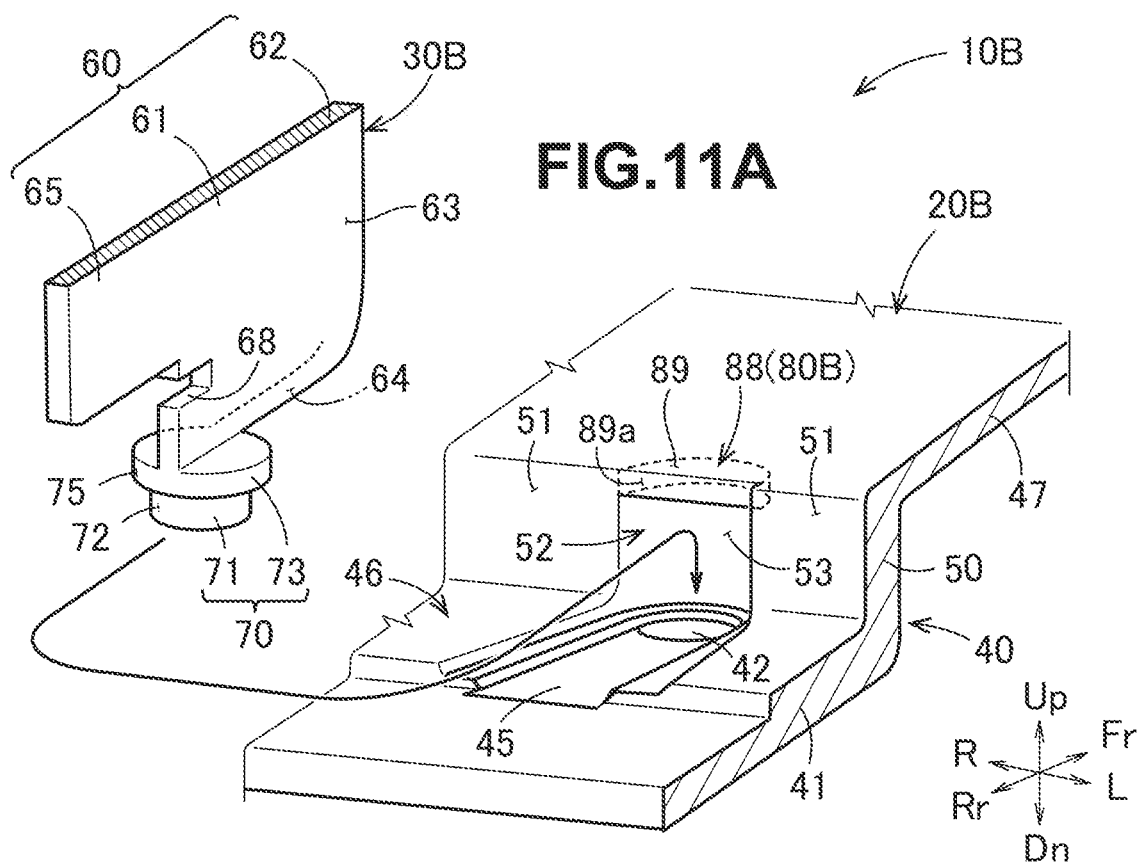
FIG. 11A is a view for describing the air-conditioning outlet device according to the third embodiment.

Referring to FIG. 11A, an air-conditioning outlet device 10B according to a third embodiment includes a fin 30B and a housing 20B. Configurations that are common to the air-conditioning outlet device of the first embodiment are denoted by the same reference signs as in the first embodiment, and descriptions thereof will not be repeated.

Figure 11B:
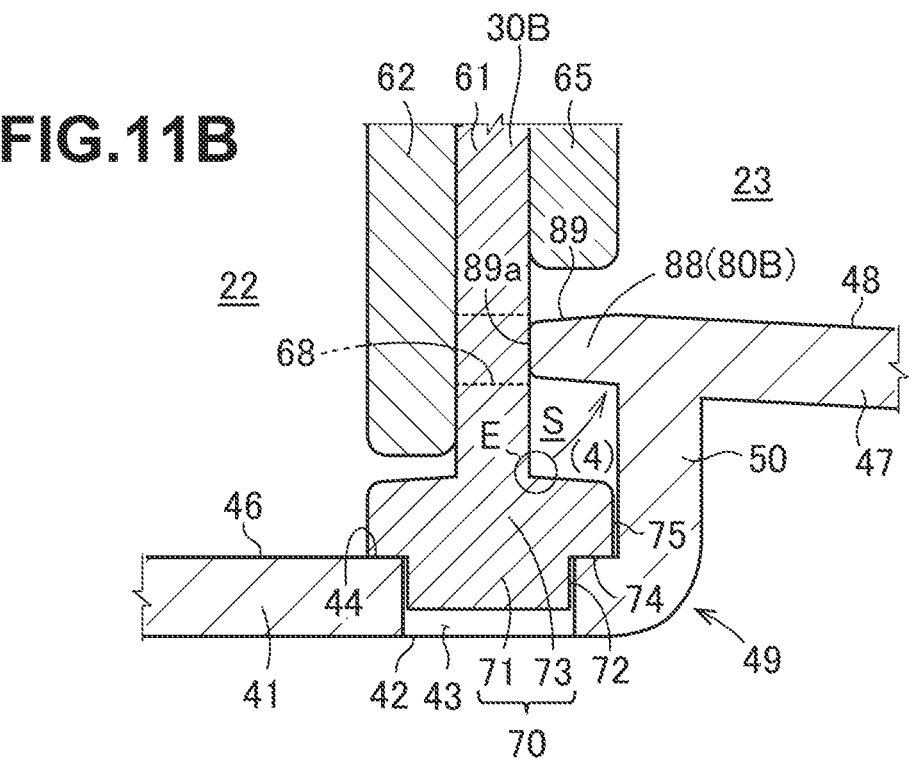
FIG. 11B is a view for describing an action of the air-conditioning outlet device according to the third embodiment.

Referring to FIG. 11A and FIG. 11B, a barrier wall 80B is formed of a housing-side lid portion 88 that is provided on the housing 20B to close the blow-in space S. The housing-side lid portion 88 is integrated with the wall surface 53 of the clearance recess 52, and an upper surface 89 (surface facing the center CL side) of the housing-side lid portion 88 is located on substantially the same plane as (namely, is flush with) the inner surface 48 of the stepped portion 47. A rear surface 89a (surface facing the upstream side) of the housing-side lid portion 88 is located on (namely, is flush with) substantially the same plane as the overlapping surface 51.

A clearance groove 68 for avoiding contact with the housing-side lid portion 88 is formed in the fin 30B. The clearance groove 68 extends inward from an end surface of the center portion 61 of the fin 30B in the radial direction.

As indicated by arrow (4), the flow of the air that has flowed from the inlet E into the blow-in space S is shut off by the housing-side lid portion 88. The leakage of the air around the shaft portions 70 can be suppressed.

Incidentally, the invention is not limited to the embodiments as long as the actions and the effects of the invention are exhibited.

What is claimed is:

1. An air-conditioning outlet device comprising:
    a housing having a frame shape and having a flow path through which air flows; and
    a fin which is disposed in the flow path and by which the flow path is openable and closable,
    wherein the fin includes a plate-shaped portion and a pair of shaft portions protruding from the plate-shaped portion in opposite directions,
    the housing includes a pair of support portions that support the respective shaft portions and that are integrated with each other,
    each of the support portions includes a base portion having a support hole that rotatably supports the shaft portion, with respect to the base portion, a stepped portion stepped in a direction toward a center of the housing with an axis direction of the shaft portion as a reference, and a connecting portion that connects the base portion and the stepped portion,
    the connecting portion has an overlapping surface that the plate-shaped portion of the fin is overlappable in a state where the flow path is closed, and a clearance recess recessed from the overlapping surface so as not to come into contact with the fin when the fin rotates from the state where the flow path is closed,
    in the state where the flow path is closed, the clearance recess of the connecting portion and the plate-shaped portion define a blow-in space into which the air is blown from a gap between the plate-shaped portion and the base portion, and
    one of the fin and the housing includes a barrier wall that interferes with the air flowing through the blow-in space.

2. The air-conditioning outlet device according to claim 1, wherein the shaft portion includes a large-diameter portion having an annular end surface that is contactable with an edge of the support hole,
    the barrier wall is formed of a bulging portion that bulges from the fin and the large-diameter portion toward a wall surface of the clearance recess, and
    the bulging portion has a facing surface facing the wall surface of the clearance recess.

3. The air-conditioning outlet device according to claim 2, wherein a lightening recess is formed on an opposite side of the fin from the bulging portion.

4. The air-conditioning outlet device according to claim 1, wherein the barrier wall is formed of a fin-side lid portion provided on the plate-shaped portion so as to close the blow-in space.

5. The air-conditioning outlet device according to claim 1, wherein the barrier wall is formed of a housing-side lid portion provided on the housing so as to close the blow-in space.

* * * * *